(12) United States Patent
Taipale

(10) Patent No.: US 8,559,570 B2
(45) Date of Patent: Oct. 15, 2013

(54) CANCELLATION OF UNDESIRED PORTIONS OF AUDIO SIGNALS

(75) Inventor: Dana Taipale, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 2384 days.

(21) Appl. No.: 11/241,419

(22) Filed: Sep. 30, 2005

(65) Prior Publication Data

US 2007/0002972 A1    Jan. 4, 2007

Related U.S. Application Data

(60) Provisional application No. 60/695,335, filed on Jun. 30, 2005.

(51) Int. Cl.
*H03D 1/04* (2006.01)
*H03D 1/06* (2006.01)
*H03K 5/01* (2006.01)

(52) U.S. Cl.
USPC .............................. 375/345; 375/346; 375/362

(58) Field of Classification Search
USPC ......... 375/354, 371, 345, 359, 362, 326, 134, 375/145; 455/182.1, 182.2, 182.3, 183.1, 455/192.1, 192.2, 255, 256, 257, 258, 259, 455/265, 239.1; 327/141, 145, 144
See application file for complete search history.

(56) References Cited

U.S. PATENT DOCUMENTS

| | | | |
|---|---|---|---|
| 5,537,121 A * | 7/1996 | Lennen | 342/357.61 |
| 5,576,712 A * | 11/1996 | Bian et al. | 342/160 |
| 6,226,506 B1 | 5/2001 | Welland et al. | 455/260 |
| 6,233,441 B1 | 5/2001 | Welland | 455/260 |
| 6,311,050 B1 | 10/2001 | Welland et al. | 455/260 |
| 6,327,463 B1 | 12/2001 | Welland | 455/260 |
| 6,353,358 B1 * | 3/2002 | Yoshie | 329/304 |
| 6,493,396 B1 * | 12/2002 | Ivashin et al. | 375/279 |
| 6,549,764 B2 | 4/2003 | Welland | 455/260 |
| 6,574,288 B1 | 6/2003 | Welland et al. | 375/327 |
| 6,760,575 B2 | 7/2004 | Welland | 455/260 |
| 6,882,680 B1 * | 4/2005 | Oleynik | 375/147 |
| 6,909,150 B2 * | 6/2005 | Davis | 257/368 |
| 7,228,117 B2 * | 6/2007 | Ichihara | 455/192.2 |
| 7,333,423 B2 * | 2/2008 | Palaskas et al. | 370/210 |
| 7,535,952 B2 * | 5/2009 | Hong et al. | 375/147 |
| 2002/0131426 A1 * | 9/2002 | Amit et al. | 370/401 |
| 2002/0180032 A1 * | 12/2002 | Sun et al. | 257/704 |

(Continued)

OTHER PUBLICATIONS

U.S. Appl. No. 11/259,888, filed Oct. 27, 2005, entitled "Method and Apparatus to Generate Small Frequency Changes" by Lawrence Der, Dana Taipale and Scott Willingham.

(Continued)

*Primary Examiner* — Sam K Ahn
*Assistant Examiner* — Linda Wong
(74) *Attorney, Agent, or Firm* — Trop, Pruner & Hu, P.C.

(57) ABSTRACT

In one embodiment, the present invention includes a method for determining when a step change occurs to a control value for a numerically controlled oscillator (NCO) providing a mixing signal, mixing the mixing signal with an input radio frequency (RF) signal to obtain an intermediate frequency (IF) signal and demodulating the IF signal into a demodulated signal, generating a correction value based on the step change, and applying the correction value to the demodulated signal. Other embodiments may be used to cancel other undesired signal portions, such as impulse spikes generated from the NCO change.

22 Claims, 6 Drawing Sheets

(56) References Cited

U.S. PATENT DOCUMENTS

| | | | |
|---|---|---|---|
| 2004/0002316 A1* | 1/2004 | Stevenson | 455/259 |
| 2004/0077327 A1 | 4/2004 | Lim et al. | 455/318 |
| 2004/0166815 A1 | 8/2004 | Maligeorgos et al. | 455/73 |
| 2006/0068708 A1* | 3/2006 | Dessert et al. | 455/63.1 |
| 2006/0193407 A1* | 8/2006 | Dibiaso et al. | 375/343 |
| 2006/0247810 A1* | 11/2006 | Risbo et al. | 700/94 |
| 2006/0291549 A1* | 12/2006 | Seppinen et al. | 375/227 |
| 2007/0243832 A1* | 10/2007 | Park et al. | 455/73 |
| 2008/0181292 A1* | 7/2008 | Yang et al. | 375/232 |

OTHER PUBLICATIONS

U.S. Appl. No. 11/259,910, filed Oct. 27, 2005, entitled "Controlling Fine Frequency Changes in an Oscillator" by Lawrence Der; Dana Taipale; Scott Willingham.

U.S. Appl. No. 11/226,041, filed Sep. 14, 2005, entitled "Capacitor Array Segmentation" by James P. Maligeorgos; Donald A. Kerth; Augusto M. Marques.

* cited by examiner

CANCELLATION OF UNDESIRED PORTIONS OF AUDIO SIGNALS

This application claims priority to U.S. Provisional Patent Application No. 60/695,335 filed on Jun. 30, 2005 in the name of Dana Taipale entitled CANCELLATION OF UNDESIRED PORTIONS OF AUDIO SIGNALS.

FIELD OF THE INVENTION

The present invention relates to processing radio frequency (RF) signals, and more particularly to canceling unwanted noise in such signals.

BACKGROUND

Typical wireless communications systems, including cellular telephones, radios, and other wireless systems communicate data at high frequencies, i.e., at radio frequency (RF). Radio frequency signals are electrical signals conveying useful information having a frequency from about 3 kilohertz (kHz) to thousands of gigahertz (GHz), regardless of the medium through which such signals are conveyed. Thus an RF signal may be transmitted through air, free space, coaxial cable, fiber optic cable, etc. To process RF signals receive circuitry of a receiver, for example, generally converts the received RF signals to one or more lower frequencies, including an intermediate frequency (IF) and a baseband frequency. As an example, in a radio tuner, a frequency corresponding to a desired radio channel is tuned by mixing an incoming RF signal spectrum with a frequency generated in a local oscillator (LO) to obtain signal information of the desired channel. In various implementations, such a LO may be a voltage controlled oscillator or a numerically controlled oscillator (NCO), such as a digitally controlled oscillator (DCO).

In practice, a controlled oscillator can have its frequency controlled by changing capacitance values of one or more capacitors coupled to an oscillator element, such as a resonant tank. By varying the capacitance, the frequency generated by the controlled oscillator may be correspondingly varied. This capacitance may be controlled via digital control signals, e.g., a digital control word. Various implementations may include automatic frequency control (AFC) circuitry and/or algorithms to perform frequency control. Such circuitry and algorithms thus change the value of the digital signals that in turn change capacitance values, in turn adjusting the NCO frequency.

While such frequency adjustments are needed to tune to a desired channel, e.g., a radio station, a cellular frequency channel or the like, such frequency changes can have adverse effects on other parts of a receiver. For example, instead of adjusting a frequency continuously or smoothly, a NCO is discretely controlled, often leading to a step change in the digital control signals, which in turn leads to a corresponding frequency step change. Such a step change can induce noise in different receiver circuitry. For example, the step change can lead to generation of an undesired impulse in demodulation circuitry. Furthermore, the step change may appear as step change on the output of the demodulation circuitry, resulting in a step change in output audio signals, for example. Such step changes and impulse generation can undesirably affect receiver performance.

Accordingly, a need exists to reduce or eliminate such undesired effects of a frequency change.

SUMMARY OF INVENTION

In one aspect, the present invention includes a method for determining when a step change occurs to a control value for a numerically controlled oscillator (NCO) providing a mixing signal and mixing the mixing signal with an input radio frequency (RF) signal to obtain an intermediate frequency (IF) signal. The IF signal may then be demodulated into a demodulated signal and a correction value generated based on the step change. The correction value may then be applied to the demodulated signal. In this way, noise caused by the step change may be reduced or removed. The demodulated signal may be filtered prior to applying the correction value, in some embodiments.

Yet another aspect resides in a method for determining when a step change occurs to a control value for an NCO, and repeating at least one prior demodulated sample generated from an input RF signal when the step change occurs. In this manner, an impulse generated in a demodulator upon the step change may be cancelled. Different manners of repeating the sample(s) may be implemented, such as outputting at least one delayed demodulator sample, e.g., via a delay stage, to an output signal path upon occurrence of the step change. After the impulse has cleared, a current demodulated sample may be output to the output signal path.

In one embodiment, an apparatus may include a digital signal processor (DSP) to generate a demodulated signal based on an IF signal obtained from an incoming RF signal mixed with a controlled oscillator frequency signal and a cancellation circuit to cancel a portion of the demodulated signal caused by a change in the controlled oscillator frequency signal. The cancellation circuit may be adapted to insert a step change correction into the demodulated signal and/or to repeat at least one demodulated sample to avoid the portion of the demodulated signal. In some embodiments, the cancellation circuit may be implemented as part of the DSP.

Applications for cancellations in accordance with an embodiment of the present invention are numerous. As one example, an integrated terrestrial audio broadcast receiver may implement the methods. The receiver may be used in a portable device having an integrated terrestrial audio broadcast receiver. The portable device, which may be a digital media player, such as an MP3 player, can include the ability to receive a wide variety of audio broadcasts, including AM spectrum and FM spectrum signals.

DETAILED DESCRIPTION

In various embodiments, adverse consequences of a frequency step change occurring in receiver circuitry may be reduced or eliminated using different cancellation methods and apparatus. For example, in a receiver that implements a NCO, a discrete frequency change can lead to a frequency step change in the resulting processed signals, as well as generation of an undesired impulse spike in demodulator circuitry of the receiver. Accordingly, embodiments of the present invention may cancel these undesired elements based upon knowledge of a relative size and timing of the frequency change.

In some embodiments, circuitry and/or algorithms may be implemented to reduce or remove a frequency step change occurring on a change to control signals for an NCO. As discussed, this step change in frequency arising from a change in numerical control produces a step change in the demodulation output. As an example, an incoming FM signal is downconverted to an IF signal of the form IF=$A_c \cos(\omega_{if}t + k\int s(z)dz)$, where s(z) is the desired signal, $A_c$ is the value of the front-end gain, and k is the value of frequency deviation. FM demodulation recovers the derivative of the angle, i.e., $FM_{out}=\omega_{IF}+k\, s(t)$.

However, $\omega_{IF}$ is the result of a mixing/low pass filtering (LPF) operation. Ideally, $\omega_{IF}=k_2(\omega_{FMsignal} \pm \omega_{LO})$, where $k_2$ is the gain of the filtering operation. When the NCO control signal N is changed, a nearly instantaneous change in $\omega_{LO}$ to $\omega_{LO}+\Delta$ occurs, where $\Delta$ is the frequency change corresponding to the value of N. Accordingly, the IF signal also adjusts to $\omega_{IF}+\Delta$ (or $\omega_{IF}-\Delta$ depending on which component the mixer passes). Hence, the audio output is also changed. In the case of an FM signal, $FM_{out}$, the new value corresponds to $FM_{out}=k_2\,(w_{IF}+\Delta+k\,s(t))$, and there is thus a nearly instantaneous change in the output of size $k_2\Delta$.

To compensate for this instantaneous change, a post-correction may be implemented after demodulation is performed. In one form, the post-correction is a scaled, delayed (by the group delay of demodulation) step. Thus, the correction may correspond to $-k_2\Delta$ for a change to N that produces a frequency change of $\Delta$. This correction value may be applied to the audio signal generated by the demodulation circuitry, delayed to match the $k_2\Delta$ step from the demodulator.

Figure 1:
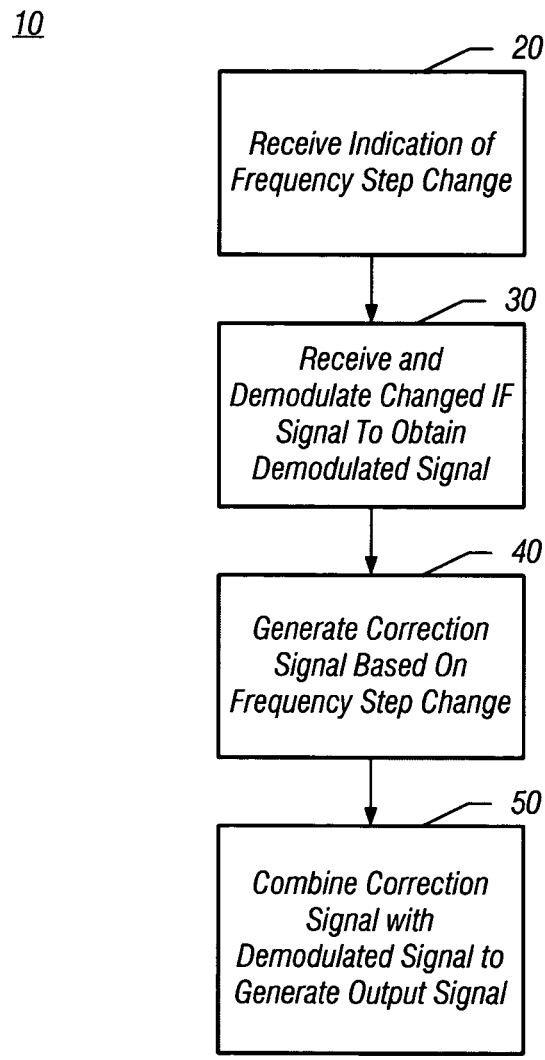
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to correct for step changes occurring as a result of changing a control signal for an NCO. Method 10 may begin by receiving an indication of a frequency step change (block 20). For example, AFC circuitry may cause a change to a digital control signal (e.g., a digital control word) that is used to control an NCO. Such AFC circuitry may operate upon tuning to a desired frequency, continuously or at intervals to maintain a desired frequency over temperature, voltage, and product variations, for example.

As discussed above, such a frequency step change can lead to an undesired step change in an audio output signal. Specifically, the frequency step change causes a change in the LO output, in turn causing a nearly instantaneous frequency change to an intermediate frequency (IF) signal generated by mixing the LO frequency with an incoming RF signal. This changed IF signal is received by demodulation circuitry which receives it and generates a demodulated signal therefrom (block 30). The demodulated signal may include a undesired step function. While the scope of the present invention is not so limited, in various embodiments the demodulation circuitry may be implemented in digital signal processor (DSP) circuitry that performs demodulation as well as other processing on incoming signals such as filtering, decoding, and the like.

Still referring to FIG. 1, to prevent or reduce the undesired effect of a step change on the demodulated signal, a correction may be generated. Specifically, a correction signal may be generated based on the frequency step change (block 40). While block 40 is shown following block 30, it is to be understood that in various embodiments, the correction signal may be generated while demodulation of the changed IF signal is occurring. Furthermore, in certain implementations, depending upon the group delay of demodulation, the correction signal may be generated even prior to completion of demodulation. In various embodiments, this correction signal may be generated based upon the received indication of the frequency step change. That is, it is known when the frequency change is going to occur, as well as the magnitude of the frequency change. Accordingly, a correction signal may be generated that is based on the timing and magnitude of the frequency step change. The correction signal may be generated using the same DSP that handles demodulation. Alternately, the correction signal may be generated elsewhere.

Next, the correction signal may be combined with the demodulated signal to generate an output signal (block 50). Specifically, the correction signal may be combined with the demodulated signal that includes the step change to cancel the undesired step change. In such manner, the output signal (e.g., a FM output signal) is generated that corrects for (i.e., cancels) the undesired step change.

In different embodiments, various manners of compensating for the step change may be implemented. For example, step change cancellation may be implemented in specific hardware, or may be implemented in software and/or firmware, or a combination thereof. For example, in one embodiment step change cancellation may be implemented in a DSP.

Figure 2:
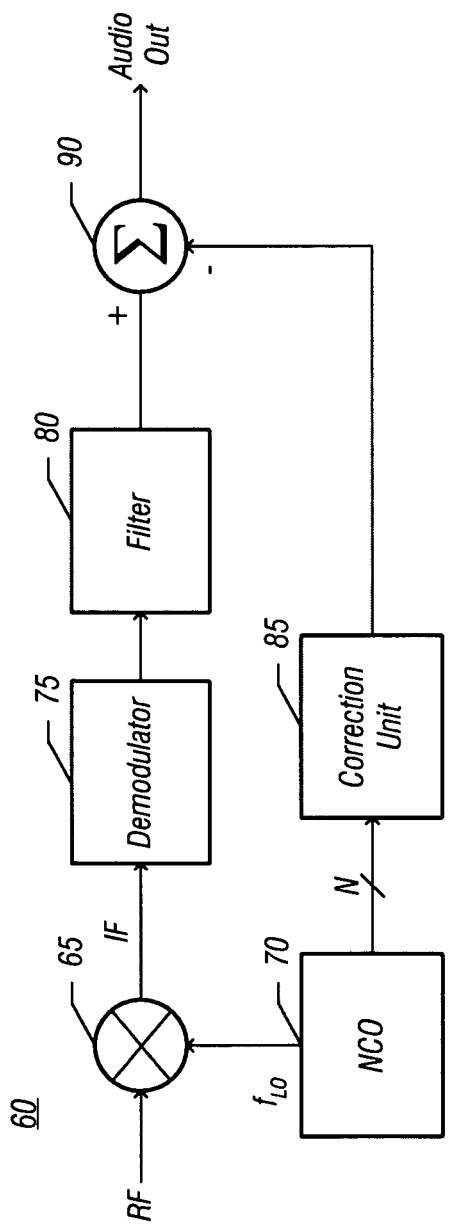
FIG. 2 is a block diagram of an example implementation for step change cancellation.

Referring now to FIG. 2, shown is a block diagram of an example implementation for step change cancellation. Specifically, circuitry 60 corresponds to a portion of a receive chain of a receiver. While shown in FIG. 2 as including discrete components, it is to be understood that in some implementations, at least a portion of circuitry 60 may take the form of DSP or other processing circuitry that is programmed to perform in accordance with an embodiment of the present invention. That is, instead of certain components shown that form circuitry 60, in some implementations a DSP may be programmed to perform step change cancellation using the standard processing engines of the DSP.

As shown in FIG. 2, incoming RF signals are received at a mixer 65, where the signals are downconverted to an IF signal based upon the frequency of an NCO 70, which generates an LO frequency, $f_{LO}$. In some embodiments, mixer 65 may be a complex mixer or alternately, different mixers may be present to handle mixing of I and Q signals. However these signals are shown as a single signal for ease of discussion. While shown as providing IF signals directly from mixer 65 to a demodulator 75, it is to be understood that additional circuitry and processing may be performed prior to demodulation. For example, mixer 65 may be configured to downconvert incoming RF signals to a low-IF frequency, which may be fixed or at a varying frequency. Accordingly, prior to demodulation, additional circuitry to convert the low-IF signals into digital signals for demodulation, as well as to perform additional processing, such as gain and signal filtering functions, may be present. The resulting digital signals are thus provided to demodulator 75, which performs demodulation on the incoming signal and other signal processing functions. The demodulated signals may, in some embodiments, be provided to a filter 80 for filtering. However, in other embodiments such a filter may not be present. Either way, the demodulated signals are provided to a summer block 90.

As discussed, a demodulated signal may include a step function when NCO 70 is controlled to a different frequency. To effect step cancellation in accordance with an embodiment of the present invention, NCO 70 may provide its control signal, N, to a correction unit 85. While shown in FIG. 2 as being provided from NCO 70, it is to be understood that the control signal may be provided to correction unit 85 from wherever it is generated, for example, AFC circuitry, if it is separate from NCO 70. In turn, correction unit 85 may generate a correction signal based on receipt of the digital control signal. In one embodiment, correction unit 85 may generate a correction signal by applying a value of the step change Δ produced by the control signal N to a gain of the receiver path. For example, the gain may correspond to a gain of demodulator 75 and filter 80, as well as their response over time to the step change. That is, the correction may include the response of filter 80 to the step. The resulting correction signal is also applied to summer block 90, where it is subtracted from the demodulated signal. Accordingly, the output signal, which may then be converted to an analog signal, is generated with a canceled step function. Correction unit 85 may also apply a scaling and a delay based on the group delay of demodulator 75 to generate the correction signal.

In some embodiments, post-correction may occur before filtering the demodulated output. By performing post-correction before filtering, the correction signal may be more easily generated and applied to the demodulator output. Then, if desired, filtering of the corrected demodulated signal may occur. In some implementations a calibration method may be applied to the NCO to determine the exact values of frequency changes caused by a given change to a digital control signal. For example, a calibration method may determine differences between differently sized and/or implemented capacitor banks that are used to generate the NCO frequency. Such calibration methods may more closely track changes on a per-device basis. In some implementations a calibration method such as that disclosed in co-pending and commonly owned U.S. Provisional Patent Application No. 60/695,320 entitled "Methods And Apparatus To Generate Small Frequency Changes", which was filed on Jun. 30, 2005, and which is hereby incorporated by reference in its entirety, may be performed.

Still further in some embodiments, a slow decay process may be placed on the applied correction to avoid accumulating a (partially unfounded) DC component to the NCO correction, while keeping the artifacts from the decay out of the desired bandwidth of the audio output. For example, an exponential decay with a time constant on the order of between approximately 0.1 second and 1 second has most of its energy below 30 Hz, which would be suitable for audio signals.

Figure 3A:
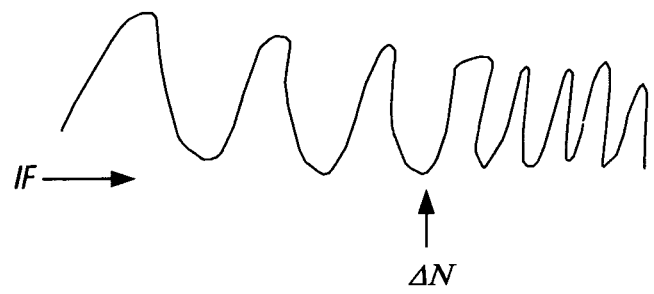
FIG. 3A is a graphical representation of an IF signal that is provided to a demodulator.
Figure 3B:
FIG. 3B is a graphical representation of a demodulator output that includes a spike caused by a slope discontinuity.

In addition to the step change described above, a change to the numerical control N can produce a nearly instantaneous change in the slope of the demodulator input. This near discontinuity in slope is ideally differentiated by the demodulator, producing a large undesired spike in the demodulator output. Referring now to FIG. 3A, shown is a graphical representation of an IF signal that is provided to a demodulator (prior to analog-to-digital conversion). As shown in FIG. 3A at the point of numerical change causing an LO frequency change, a slope discontinuity occurs in the IF signal stream. This slope discontinuity leads to an impulse spike at the output of demodulation circuitry. Referring now to FIG. 3B, shown is a graphical representation of a demodulator output that includes a spike 310 caused by a slope discontinuity.

An additional complication exists for phase-locked loop (PLL) demodulators. For large spikes, the PLL will wrap, since the phase tracking is modulo 2π. Hence, the magnitude of the spike is not linear to the magnitude of the frequency step. This makes such an impulse spike difficult to predict and cancel. Another complication is that the discontinuity in slope depends on the characteristics of the signal at the time of the discontinuity, and so the magnitude and sign of the discontinuity changes with time. In particular, for many cases the physical processes that determine the signal and those that initiate a change in NCO settings are distinct and uncorrelated. Hence, characteristics of the resulting distortion may be difficult to predict.

Figure 3C:
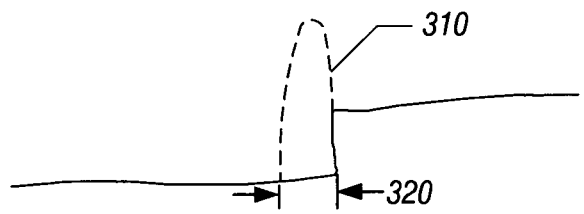
FIG. 3C is a graphical representation of a demodulator output in accordance with an embodiment of the present invention

While it may be difficult to predict the size of an impulse spike, in at least certain implementations, it is known when the spike will occur. For example, for systems with automatic frequency control, it is known when frequency changes are applied (since the system determines when to apply them). Based on this knowledge, the timing of the correction may be controlled. In some embodiments, previous data may be repeated to overwrite the period of the predicted spike. For slow moving signals (e.g., audio signals), the repetition of data may be far more accurate than the spike. Referring now to FIG. 3C, shown is a graphical representation of a demodulator output including repeated data 320 in accordance with an embodiment of the present invention. As shown in FIG. 3C, by repeating a previous portion of the demodulator output, the undesired spike (shown in dashed form in FIG. 3C) may be overwritten.

Figure 4:
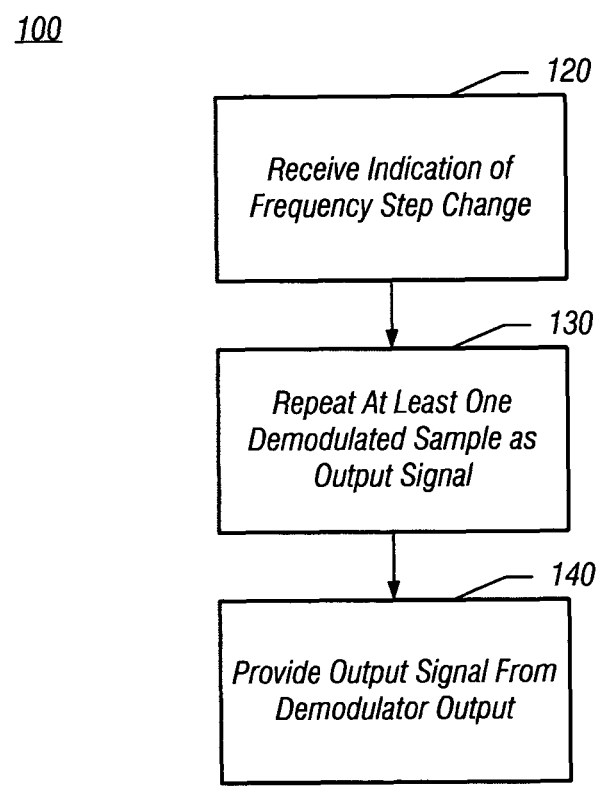
FIG. 4 is a flow diagram of a method for compensating for undesired demodulation impulses in accordance with an embodiment of the present invention.

Referring now to FIG. 4, shown is a flow diagram for compensating for undesired demodulation impulses in accordance with an embodiment of the present invention. As shown in FIG. 4, method 100 may begin by receiving an indication of a frequency step change (block 120). For example, as discussed above AFC circuitry and/or algorithm may implement a frequency change by changing the value of a control signal to digitally control an NCO. This indication may thus provide an indication of when the step change is to occur, as well as its magnitude.

Because it is difficult to determine an appropriate correction value to apply to remove an impulse generated during demodulation occurring as a result of a step change, in some embodiments a previous demodulated signal may be used in place of the impulse-affected signal. For example, at least one demodulated sample may be repeated as the output signal (block 130). In some implementations, a single repeated sample may be sufficient to avoid the spike. In one implementation, the repeated signal may be a delayed version of a prior audio signal that is inserted into the processing path to replace a portion of a demodulated signal that includes the undesired impulse. In other embodiments, other substitution schemes may be implemented.

For example, the last value generated before the spike (i.e., a last good sample) and a first value after the spike concludes (i.e., a first good sample) may be combined to effect a smoother response period. For example, in one embodiment these two values may be linearly interpolated to obtain a smoother response period. Still further, in some embodiments additional filtering may obtain a set of interpolated values that maintain the understood bandwidth of the expected signal.

In yet other embodiments, various manners of implementing impulse cancellation may be provided. For example, a delay path may be coupled to a processing path to store demodulated samples and later provide them to the processing path when an impulse event occurs. When it is determined that the impulse has passed, normal operation may continue. Specifically when the impulse ends, the output signal may again be provided from the output of the demodulator (block 140).

Figure 5:
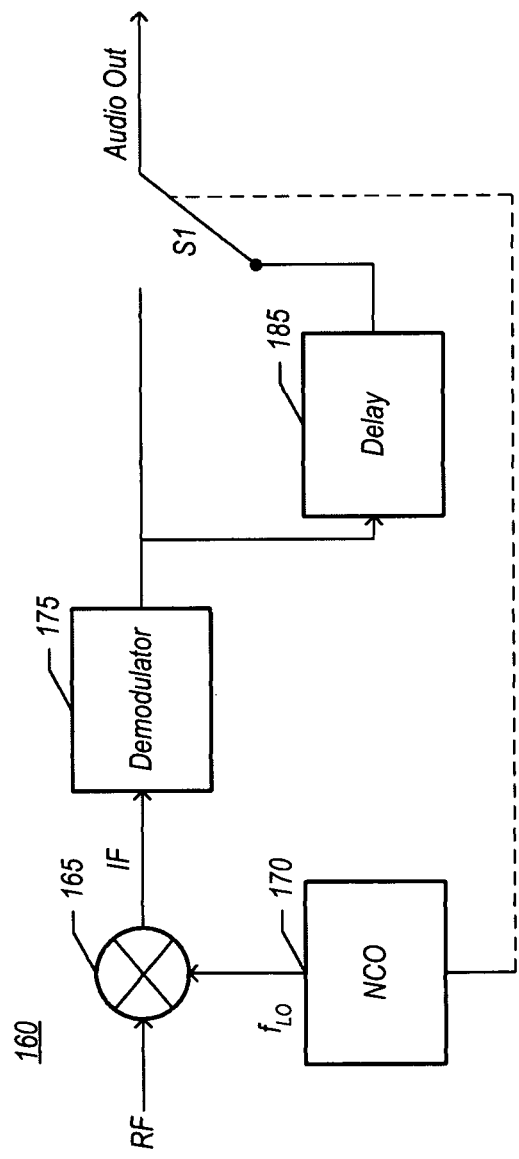
FIG. 5 is a block diagram of an implementation for impulse cancellation in accordance with one embodiment of the present invention.

Referring now to FIG. 5, shown is a block diagram of an implementation for impulse cancellation in accordance with one embodiment of the present invention. As shown in FIG. 5, circuitry 160 may be part of a processing path of a receiver. As discussed above, at least portions of circuitry 160 may be generic DSP circuitry that is programmed to perform impulse cancellation. As shown in FIG. 5, incoming RF signals are received at a mixer 165, where they are downconverted to an IF signal based on the frequency ($f_{LO}$) of an NCO 170. The IF signals after additional processing, such as analog to digital conversion and bandpass filtering, are provided to a demodulator 175 for demodulation. As shown in FIG. 5, the demodulated signals, which may correspond to demodulated audio samples, are provided out as the audio output. Furthermore, the demodulated samples are provided to an input of a delay unit 185. In various embodiments, delay unit 185 may be adapted to store one or more demodulated samples for a predetermined time period before transmitting them out of delay unit 185.

During normal operation, demodulated samples from demodulator 175 are provided as the audio output signals, as a switch S1 is normally set to allow the demodulated samples along the audio output line. However, when a frequency step change is occurring, a signal is provided to switch S1 from NCO 170. This signal may indicate a step change is occurring and accordingly, switch S1 acts to couple the output of delay unit 185 to the audio output line. In some embodiments, delay unit 185 may be configured to perform interpolations and/or filtering of delayed signals, such as a last clean sample prior to an impulse and a first clean sample after the impulse. Regardless of the type of correction signal, it may be switched onto the audio output line in place of the demodulated impulse spike. In such manner, an impulse spike which is generated by demodulator 175 upon a frequency step change is not sent along the audio output line. While shown as being controlled by a signal from NCO 170, it is to be understood that in other embodiments switch S1 may be controlled from other circuitry that is used to control a frequency step change in NCO 70, for example AFC circuitry, or other circuitry that may be separate from NCO 170. At a predetermined time after the step change, or as otherwise controlled, switch S1 may be set back to provide audio output from demodulator 175.

Figure 6:
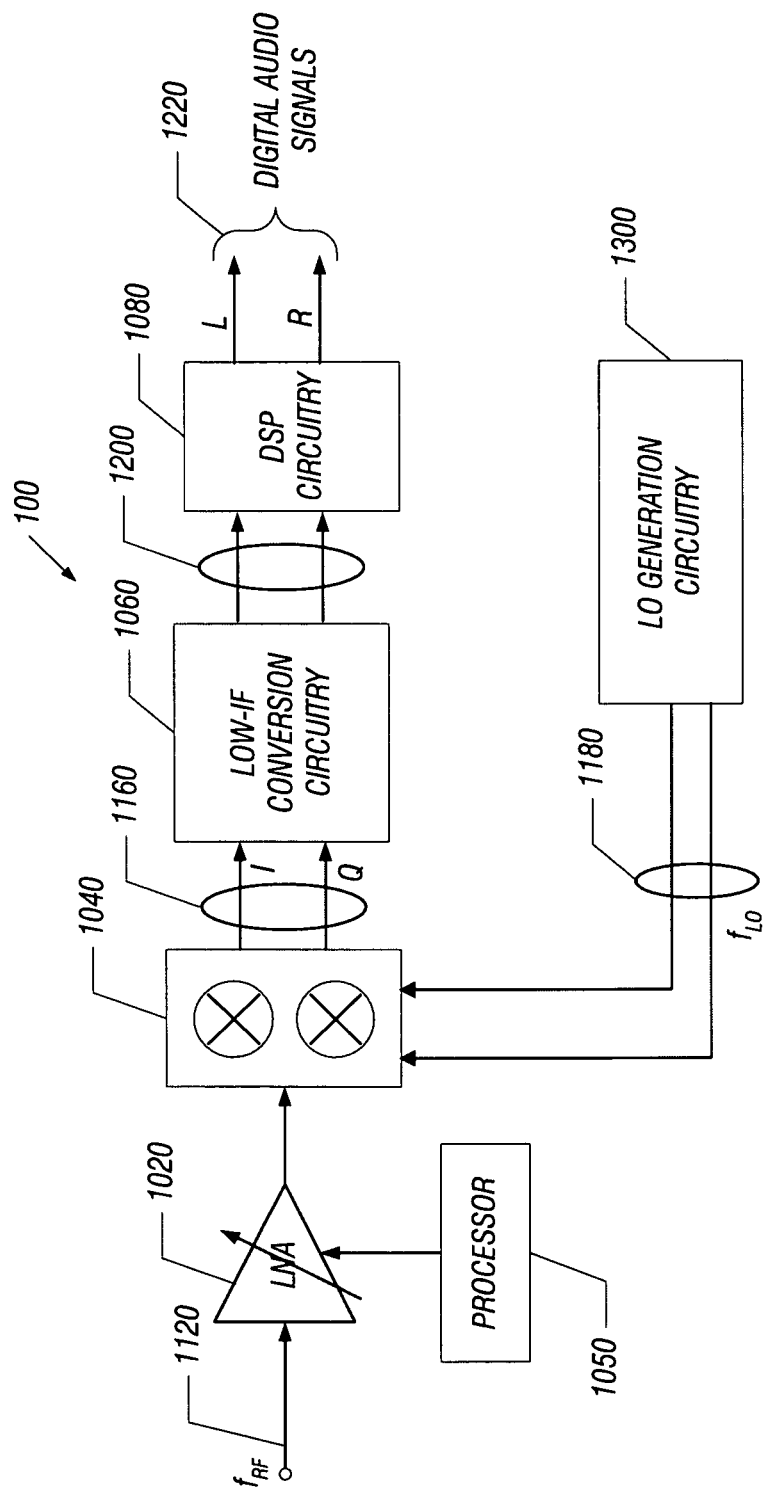
FIG. 6 is a block diagram of a system in accordance with one embodiment of the present invention.

Referring now to FIG. 6, shown is a block diagram of a radio tuner in accordance with one embodiment of the present invention. FIG. 6 is a block diagram of an embodiment 1000 for an integrated terrestrial broadcast receiver that utilizes a low-IF architecture. The input signal spectrum ($f_{RF}$) 1120 may be a RF signal spectrum that includes a plurality of channels that can be tuned. For purposes of discussion, the RF signal spectrum ($f_{RF}$) 1120 will be discussed primarily with respect to the RF signal spectrum ($f_{RF}$) 1120 being an FM terrestrial broadcast spectrum that includes a plurality of different FM broadcasts channels centered at different broadcast frequencies.

Looking back to the embodiment 1000 in FIG. 6, a low noise amplifier (LNA) 1020 receives the RF signal spectrum ($f_{RF}$) 1120. LNA 1020 may be digitally controlled by a processor 1050, which may be a microcontroller in some embodiments. Processor 105 may also be used to perform automatic gain control (AGC) for receiver 1000 instead of the AGC being provided by analog circuitry. Processor 1050 includes a processing core that executes instructions (stored in a memory, for example, of the processor) for purposes of sensing various gains and other parameters of receiver 1000 and controlling LNA 1020 (and other portions) of receiver 1000 accordingly.

In some embodiments of the invention, processor 1050 and components of the RF and IF processing chain may be integrated on the same semiconductor die (i.e., substrate) and thus may be part of the same semiconductor package or integrated circuit (IC). In other embodiments of the invention, processor 1050 may be part of the same semiconductor package as the components of the RF/IF chain but located on a separate die. In still other embodiments of the invention, processor 1050 and RF/IF chain components may be located in different semiconductor packages. Thus, many variations are possible and are within the scope of the appended claims.

Still referring to FIG. 6, the output of LNA 102 is then applied to a mixer 1040, and mixer 1040 generates in-phase (I) and quadrature (Q) output signals, as represented by signals 1160. To generate these low-IF signals 1160, the mixer 1040 uses phase shifted local oscillator (LO) mixing signals ($f_{LO}$) 1180. During operation, the local oscillator frequency may be varied, and accordingly an unwanted impulse may be generated in following demodulation circuitry. The outputs of mixer 1040 are at a low-IF, which can be designed to be fixed or may be designed to vary. In some embodiments, processor 1050 may also execute instructions to control desired frequency and perform calibrations on LO generation circuitry 1300.

Low-IF conversion circuitry 1060 receives the in-phase (I) and quadrature (Q) signals 1160 and outputs real and imaginary digital signals, as represented by signals 1200. The low-IF conversion circuitry 1060 preferably includes band-pass or low-pass analog-to-digital converter (ADC) circuitry that converts the low-IF input signals to the digital domain. And the low-IF conversion circuitry 1060 provides, in part, analog-to-digital conversion, signal gain and signal filtering functions. Further digital filtering and digital processing circuitry with the digital signal processing (DSP) circuitry 1080 is then used to further tune and extract the signal information from the digital signals 1200. The DSP circuitry 1080 then produces baseband digital output signals 1220. When the input signals relate to FM broadcasts, this digital processing provided by the DSP circuitry 1080 can include, for example, FM demodulation and stereo decoding. Furthermore, the DSP circuitry 1080 can perform impulse cancellation in accordance with the embodiments described herein. Digital output signals 1220 can be left (L) and right (R) digital audio output signals 1220 that represent the content of the FM broadcast channel being tuned, as depicted in the embodiment 1000 of FIG. 6. It is noted that the output of the receiver 1000 can be other desired signals, including, for example, low-IF quadrature I/Q signals from an analog-to-digital converter that are passed through a decimation filter, a baseband signal that has not yet been demodulated, multiplexed L+R and L−R audio signals, L and R analog audio signals, and/or any other desired output signals.

It is further noted that the architecture of the present invention can be utilized for receiving signals in a wide variety of signal bands, including AM audio broadcasts, FM audio broadcasts, television audio broadcasts, weather channels, television signals, satellite radio signals, global positioning signals (GPS), and other desired broadcasts, among many other signal types.

In some embodiments receiver 1000 may be implemented in a portable device. While different implementations are possible, it is noted that a portable device may preferably be a small portable device. For example, the portable device could be a cellular phone, an MP3 player, a PC card for a portable computer, a USB connected device or any other small portable device having an integrated receiver.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining when a step change occurs to a control value for a numerically controlled oscillator (NCO) providing a mixing signal;
    mixing the mixing signal with an input radio frequency (RF) signal to obtain an intermediate frequency (IF) signal and demodulating the IF signal into a demodulated signal;
    generating a correction value based on a timing and magnitude of the step change; and
    filtering the demodulated signal prior to applying the correction value to the demodulated signal.

2. The method of claim 1, wherein generating the correction value comprises applying the step change to a response of a filter.

3. The method of claim 1, wherein generating the correction value comprises multiplying a frequency change of the mixing signal caused by the step change by a scaled value.

4. The method of claim 3, wherein the scaled value comprises a demodulator gain.

5. The method of claim 1, further comprising decaying the correction value by a predetermined amount.

6. The method of claim 1, further comprising canceling a change in the demodulated signal caused by the step change via the correction value.

7. A method comprising:
    mixing a mixing signal with an input radio frequency (RF) signal to obtain a downconverted signal;
    demodulating the downconverted signal to output demodulated samples as an output signal;
    determining when a step change occurs to a control value for a numerically controlled oscillator (NCO) providing the mixing signal to the input RF signal; and
    repeating at least one prior demodulated sample generated from the input RF signal as the output signal when the step change occurs by outputting at least one delayed demodulated sample to an output signal path upon occurrence of the step change, including switching the at least one delayed demodulated sample to the output signal path and thereafter switching the demodulated samples to the output signal path.

8. The method of claim 7, further comprising thereafter outputting a current demodulated sample to the output signal path.

9. An apparatus comprising:
    a digital signal processor (DSP) to generate a demodulated signal based on an intermediate frequency (IF) signal obtained from an incoming radio frequency (RF) signal mixed with a controlled oscillator frequency signal and to output the demodulated signal via an output line;
    a cancellation circuit to cancel a portion of the demodulated signal caused by a change in the controlled oscillator frequency signal; and
    a switch coupled to the output line and to couple the cancellation circuit to the output line after the change in the controlled oscillator frequency, the switch otherwise controlled to allow the demodulated signal to be output via the output line.

10. The apparatus of claim 9, wherein the cancellation circuit is to insert a step change correction into the demodulated signal.

11. The apparatus of claim 9, wherein the cancellation circuit is to repeat at least one demodulated sample to avoid the portion of the demodulated signal.

12. The apparatus of claim 11, wherein the at least one repeated demodulated signal is to be switched into the output line coupled to the DSP.

13. The apparatus of claim 9, wherein the cancellation circuit comprises a portion of the digital signal processor.

14. The apparatus of claim 9, wherein the cancellation circuit is to interpolate a first sample generated before the change in the controlled oscillator frequency and a second sample generated after the change in the controlled oscillator frequency.

15. The apparatus of claim 14, wherein the cancellation circuit is to insert the interpolated value into the demodulated signal.

16. The apparatus of claim 9, wherein the cancellation circuit is to generate a set of interpolated values to insert into the demodulated signal.

17. A system comprising:
    a mixer to mix an incoming radio frequency (RF) signal with a controlled oscillator frequency to obtain an intermediate frequency (IF) signal;
    a controlled oscillator to generate the controlled oscillator frequency;
    a digital signal processor (DSP) to generate a demodulated signal based on the IF signal; and
    a correction circuit to apply a correction to subtract an undesired impulse within the demodulated signal caused by a change in the controlled oscillator frequency, the correction based on a timing and magnitude of the change in the controlled oscillator frequency.

18. The system of claim 17, wherein the correction circuit is to store samples of the demodulated signal and to couple at least one of the samples to an output of the DSP in place of the undesired impulse.

19. The system of claim 17, wherein the controlled oscillator, the mixer and the DSP are integrated in a single substrate.

20. The system of claim 17, wherein the correction circuit is to generate a set of interpolated values to insert into the demodulated signal.

21. The method of claim 1, wherein generating the correction value comprises interpolating a first sample generated before the step change and a second sample generated after the step change.

22. The apparatus of claim 9, wherein after coupling the cancellation circuit to the output line, the switch is to allow the demodulated signal to be output via the output line at a predetermined time after the change in the controlled oscillator frequency signal.

* * * * *